United States Patent [19]

Thelen et al.

[11] Patent Number: 5,767,977
[45] Date of Patent: Jun. 16, 1998

[54] METHOD AND APPARATUS FOR A CARRIAGE LATCH AND POWER CORD LOCK-OUT SYSTEM FOR AN OPTICAL SCANNER

[75] Inventors: John G Thelen, Fort Collins; Lance W Dismang, Greeley, both of Colo.

[73] Assignee: Hewlett-Packard Co., Palo Alto, Calif.

[21] Appl. No.: 769,334

[22] Filed: Dec. 19, 1996

[51] Int. Cl.⁶ .............. H04N 1/04; G03G 21/00; H01R 13/44; H02H 00/00
[52] U.S. Cl. .............. 358/296; 358/474; 399/88; 399/107; 439/136; 307/326
[58] Field of Search ............................ 358/296, 471, 358/474, 480–483, 494, 497, 505, 509–514; 200/51 R, 51.09, 51.1, 253.1, DIG. 24; 359/197, 198; 399/88, 107, 108, 110, 118; 439/131–150, 188, 296, 911; 150/165; 307/326, 328

[56] References Cited

U.S. PATENT DOCUMENTS

| 3,728,586 | 4/1973 | Inhelder et al. ............ 439/133 X |
| 4,167,658 | 9/1979 | Sherman .................. 200/51 R |
| 4,596,908 | 6/1986 | Mott ...................... 200/51.09 |
| 4,916,550 | 4/1990 | Miyake et al. .............. 358/471 |
| 5,344,331 | 9/1994 | Hoffman et al. ............ 439/138 |

Primary Examiner—Eric Frahm
Attorney, Agent, or Firm—Cynthia S. Baan

[57] ABSTRACT

An improved carriage locking system that prevents the power cord of an optical scanner from being plugged into the scanner when the optical carriage assembly of the scanner is in the locked position. The locking system may include a locking member that the user unlocks to access the power cord receptacle upon initial setup of the scanner. The locking system may also include a spring loaded locking member that latches the optical carriage assembly against movement whenever the power cord is removed from the power cord receptacle.

3 Claims, 5 Drawing Sheets

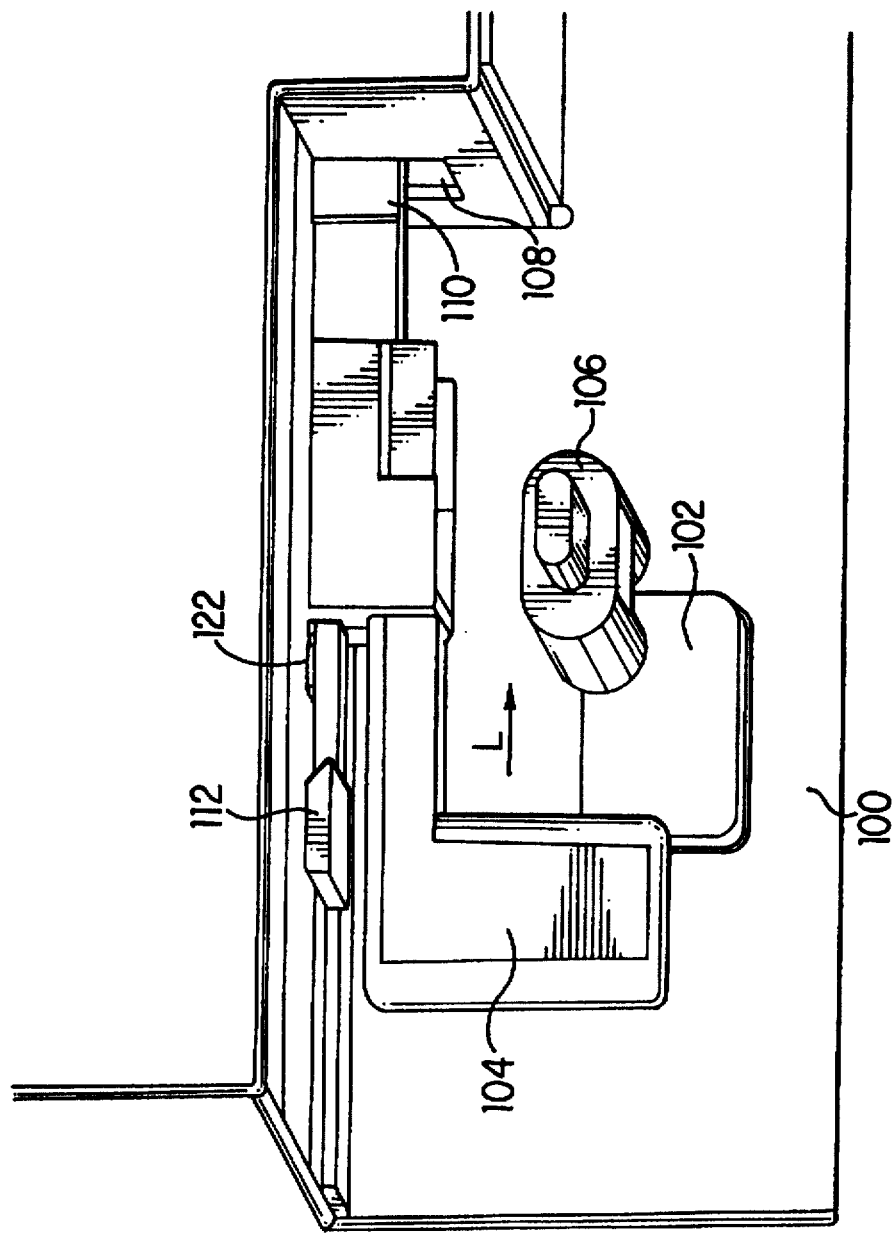

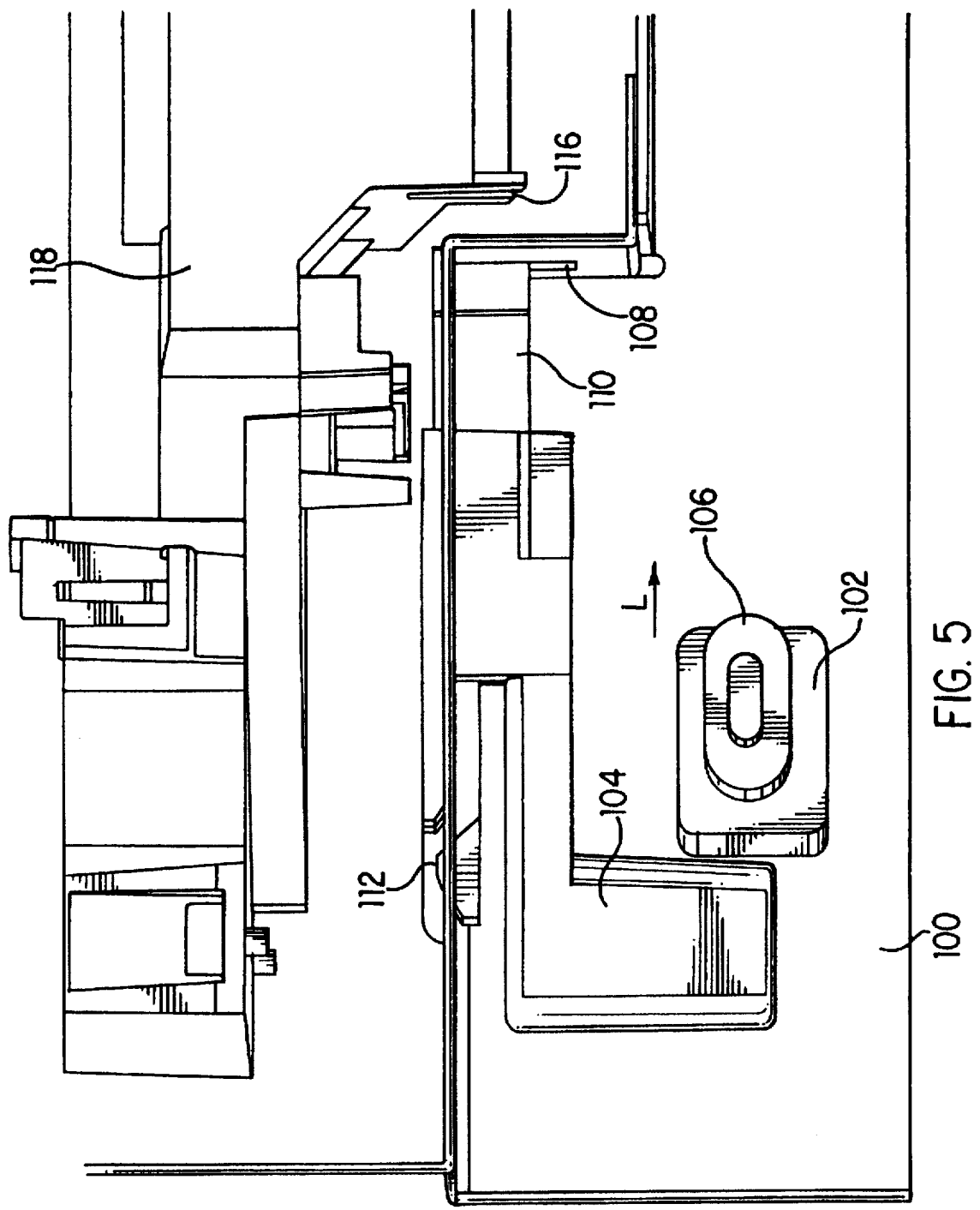

METHOD AND APPARATUS FOR A CARRIAGE LATCH AND POWER CORD LOCK-OUT SYSTEM FOR AN OPTICAL SCANNER

FIELD OF THE INVENTION

The present invention relates generally to the field of optical scanners and more particularly to a method for preventing a scanner from being powered on while the optical carriage assembly is in the locked position.

BACKGROUND OF THE INVENTION

Optical scanners are used to capture and digitize images. For example, an optical scanner may be used to capture the image of printed matter on a sheet of paper. The digitized image may then be electronically stored and/or processed with character recognition software to produce ASCII text, sent to a computer screen or to a printer. The typical optical scanner includes a light source; various lenses, mirrors and other optical components; a linear array of photoelectric sensing elements such as a CCD array; an optical carriage assembly; a motor; analog amplifier; an analog to digital converter; a controller and a random access memory (RAM).

FIG. 1 shows a schematic sectional view of a typical optical scanner. A light source illuminates a document 6 placed on a glass platen 4. The light source consists of a lamp 2, a concave mirror 8 and an infrared filter 10. The light reflected from the document 6 is reflected successively in a scanner which comprises a first mirror 12, a second mirror 14 and a third mirror 16. Then the reflected light is transmitted through a lens assembly 18 and finally to a photoelectric sensor 20.

The photoelectric sensor 20 is held by a holder 22. The sensor holder 22 and the lens assembly 18 are mounted on a moveable optical carriage 24. The reading magnification of an image of document 6 can be varied by moving the optical carriage 24 along the optical axis 26 of the lens assembly 18 by using a motor (not shown).

Generally, when a scanner is packaged it is a good idea to lock the optical carriage so that it cannot move during shipment. Otherwise, the optical carriage may move around and cause the optical components of the scanner to get out of proper alignment or cause damage to components of the scanner. However, despite numerous warning labels, a certain percentage of end users do not understand that they must unlock the optical carriage prior to power up the scanner. Otherwise, the scanner will not work. Some end users may open the scanner to ascertain the problem themselves, which could cause electrical shock to the end user or ESD damage to internal scanner components, resulting in unnecessary customer returns. Also, a certain percentage of these same end users tend to call the manufacturer's support centers to determine why the scanner does not work, which may cost tens of thousands of dollars per year in unnecessary customer service time and use of 800 numbers. Moreover, the motor that moves the optical carriage of the scanner could potentially burn-up if the end user tries to operate the scanner while the optical carriage is in the locked position.

Accordingly, it would be advantageous to prevent the scanner from being powered up while the optical carriage is in the locked position. It would be a further advantage to "dummy" proof the system of locking and unlocking the optical carriage of a scanner.

SUMMARY OF THE INVENTION

The above and other aspects of the present invention are accomplished in an improved optical carriage locking system for a scanner that prevents the power cord from being plugged into the scanner when the optical carriage of the scanner is in the locked position.

One embodiment of the present invention may include an optical carriage locking system for a scanner that prevents power to the scanner from being turned on when the scanner's optical carriage assembly is in the locked position, said optical carriage locking system comprising a power cord lock-out member for preventing a power cord receptacle of said scanner from receiving a power cord when said power cord lock-out member is in a locked position, said power cord lock-out member permitting said power cord receptacle of said scanner to receive a power cord when said power cord lock-out member is in an unlocked position; and a carriage latch for preventing said optical carriage assembly of said scanner from moving within said scanner when said carriage latch is in a latched position, said carriage latch permitting said optical carriage assembly of said scanner to move within said scanner as intended during scanner operations when said carriage latch is in an unlatched position, said power cord lock-out member and said carriage latch being attached in such a manner that when said carriage latch is in the latched position, said power cord lock-out member is in the locked position and when said carriage latch is in the unlatched position, said power cord lock-out member is in the unlocked position.

BRIEF DESCRIPTION OF THE DRAWINGS

The above and other objects, features and advantages of the present invention will be better understood by reading the following more particular description of the invention, presented in conjunction with the following drawings, wherein:

FIG. 4 shows a schematic view of the scanner housing with a power cord and optical carriage locking mechanism in the unlocked position according to the present invention; and FIG. 5 shows a schematic view of the scanner housing and optical carriage with a power cord and optical carriage locking mechanism in the unlocked position according to the present invention.

DETAILED DESCRIPTION OF THE PREFERRED EMBODIMENT

Figure 1:
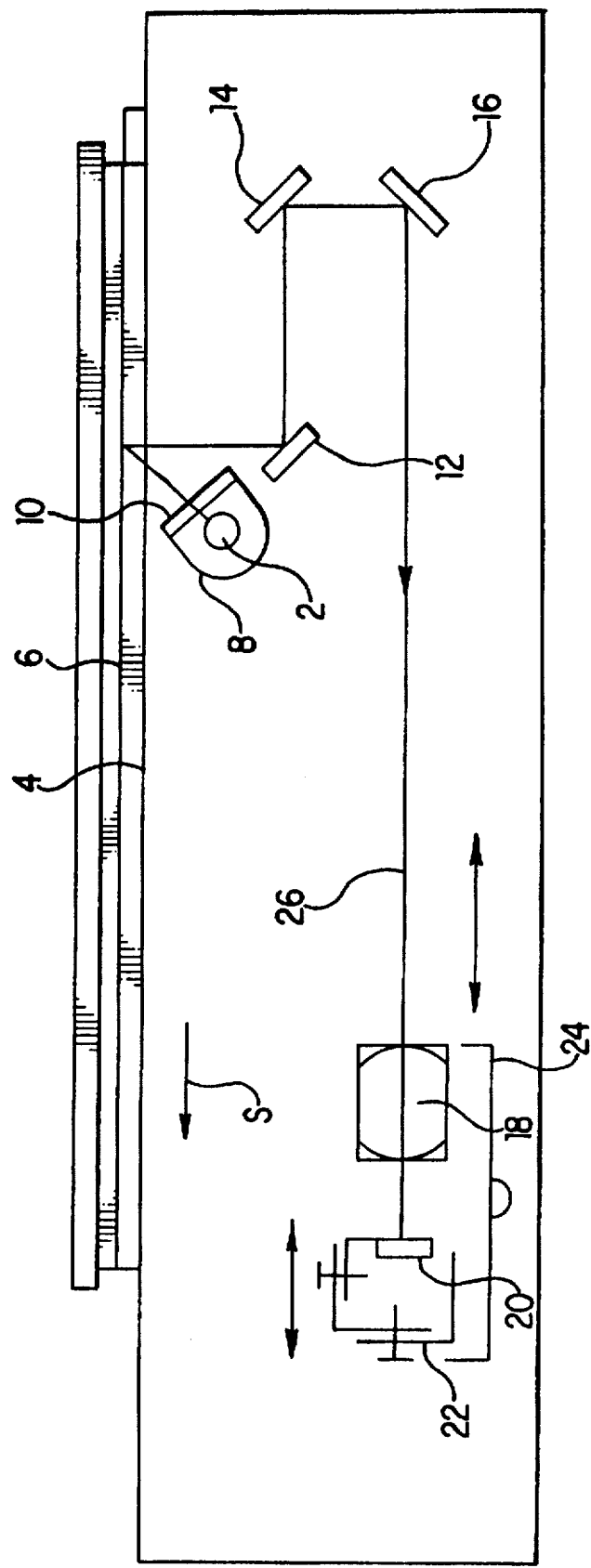
FIG. 1 shows a schematic cross-sectional view of a typical image scanner.
Figure 2:
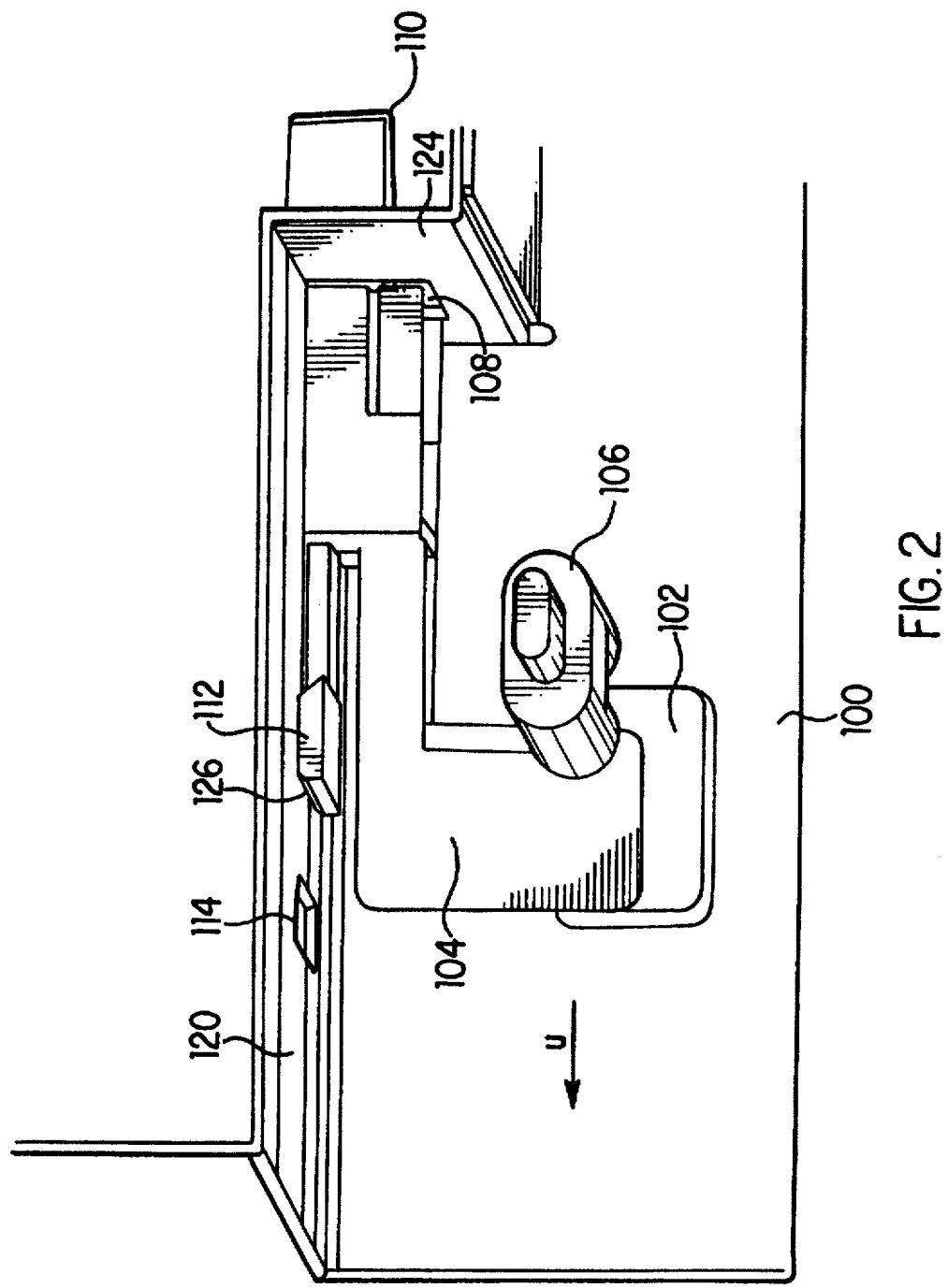
FIG. 2 shows a schematic view of the scanner housing with a power cord and optical carriage locking mechanism in the locked position according to the present invention.

FIG. 2 shows a back panel of a scanner housing 100 with a power cord receptacle 102 and a power cord lock-out 104 in the locked position, covering the access to the power cord receptacle 102. Accordingly, power cord 106 cannot be plugged into the power cord receptacle 102, and thus, power to the scanner cannot be turned on while power cord lock-out 104 is in the locked position. Power cord lock-out 104 is integral with carriage latch 110. When the power cord lock-out 104 is in the locked position, the carriage latch 110 projects through hole 108 in wall 124 of the scanner housing 100 and latches the optical carriage assembly (shown in FIGS. 3 and 5) against movement.

Locking member 112 is also integral with carriage latch 110 and power cord lock-out 104. Locking member 112 is locked into hole 122 in wall 120 of the scanner housing 100 when the power cord lock-out 104 is in the locked position and the carriage latch 110 is in the latched position, shown in FIGS. 3 and 4.

Figure 3:
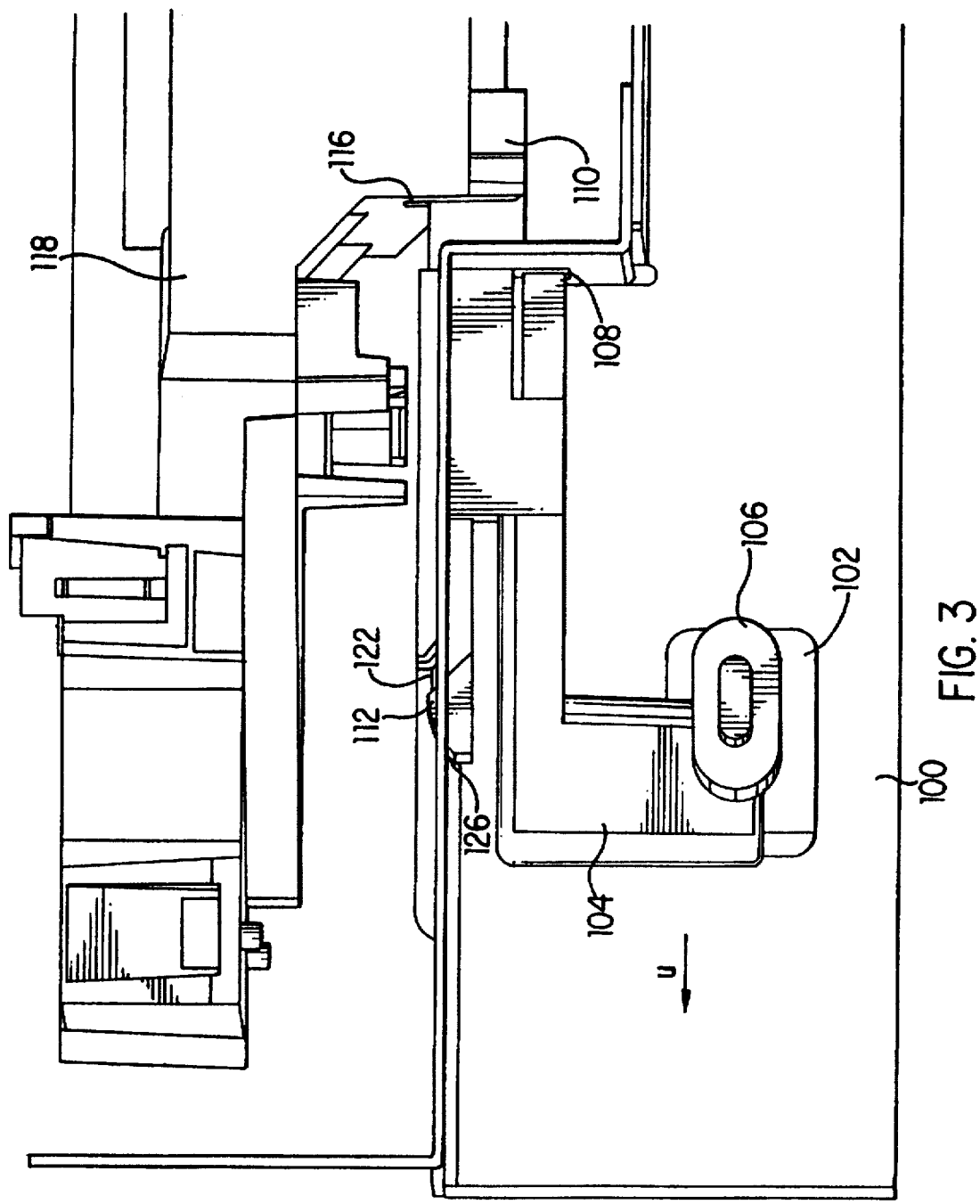
FIG. 3 shows a schematic view of the scanner housing and optical carriage with a power cord and optical carriage locking mechanism in the locked according to the present invention.

FIG. 3 shows the scanner housing 100 with a cut-away view of inside the scanner housing 100 in order to show the optical carriage assembly 118 with a slot 116 for receiving the carriage latch 110. When carriage latch 110 is projected through hole 108 in wall 124 of the scanner housing 100 and through slot 116 of the optical carriage assembly 118, the optical assembly 118 is in the latched position and is substantially prevented from moving inside the scanner housing.

FIGS. 2 and 3 show the locking member 112 locked in hole 122 in wall 120 of the scanner housing 100. To unlock the power cord lock-out 104 so that power cord receptacle 102 can receive power cord 106 and to unlatch carriage latch 110 so that the optical carriage assembly may move as intended during scanner operation, the end user may simply push power cord lock-out 104 to the left as indicated by arrow U. The locking member 112 is equipped with ramps 126 so that it will easily clear hole 122, slide to the left, and engage hole 114 when the optical carriage reaches the unlocked position.

FIG. 4 shows the back panel of a scanner housing 100 with a power cord receptacle 102 and a power cord lock-out 104 in the unlocked position with the access to the power cord receptacle 102 accessible to power cord 106. Accordingly, power cord 106 can be readily plugged into the power cord receptacle 102, and thus, power to the scanner can be turned on. When the power cord lock-out 104 is in the unlocked position, the carriage latch 110 does not project through hole 108 in wall 124 of the scanner housing 100 and does not reach the optical carriage assembly slot 116 (shown in FIG. 5) to latch the optical carriage assembly against movement. Accordingly, when the power cord receptacle 102 is accessible to the power cord 106, the optical carriage assembly 118 (shown in FIG. 5) is unlatched and free to move within the scanner housing 100 as intended during scanner operation.

Locking member 112 is locked into hole 114 in wall 120 of the scanner housing 100 when the power cord lock-out 104 is in the unlocked position and the carriage latch 110 is in the unlatched position.

FIG. 5 shows the scanner housing 100 with a cut-away view of inside the scanner housing 100 in order to show the optical carriage assembly 118 with a slot 116 for receiving the carriage latch 110. When the power cord lock-out 104 is in the unlocked position, the carriage latch 110 does not project through hole 108 in wall 124 of the scanner housing 100 and does not extend through slot 116 of the optical carriage assembly 118. Thus, the optical assembly 118 is in the unlatched position and is permitted to move inside the scanner housing 100 as intended during scanner operation.

FIGS. 4 and 5 show the locking member 112 locked in hole 114 in wall 120 of the scanner housing 100. To move the power lock-out 104 from the unlocked to the locked position, so that power cord receptacle 102 is blocked from receiving power cord 106 and the optical carriage assembly is substantially prevented from moving within the scanner housing 100, the end user may simply push power cord lock-out 104 to the right as indicated by arrow L. The locking member 112 is equipped with ramps so that it will easily clear hole 114, slide to the right, and engage hole 122 when the optical carriage assembly reaches the locked position.

The integral element of the power cord lock-out 104, the carriage latch 110 and the locking member 112 may be made of any spring-hard material, such as plastic or metal. Preferably it is all one unit of plastic, such as an ABS-PC blend, but may be different materials fastened into one integral unit.

Another embodiment may have the integral locking element including the power cord lock-out 104 and the carriage latch 110 spring loaded, such that whenever the power cord 106 is not in the power cord receptacle 102, the integral locking element comprising the power cord lock-out 104 and the carriage latch 110 are automatically in the locked/latched position. Such an embodiment may require the scanner to return the optical carriage 118 to the latchable position whenever power is turned off, such that the optical carriage latch 110 is capable of latching the carriage if the power cord 106 is removed from the power cord receptacle 102. Accordingly, if the end user needs to move or ship the scanner to a new location, when the power cord 106 is removed from the power cord receptacle 102, the optical carriage assembly 118 will automatically be prevented from moving within the scanner housing 100. Accordingly, the optical carriage assembly will be prevented from damaging or jostling optical components or electrical components within the scanner housing 100 whenever the scanner is moved.

The foregoing description of the present invention has been presented for purposes of illustration and description. It is not intended to be exhaustive or to limit the invention to the precise form disclosed, and other modifications and variations may be possible in light of the above teachings. For example, the integral locking element comprising the power cord lock-out 104 and the carriage latch 110 do not need to lock into place using locking member 112, but rather could lock by some other means, such as using an edge of the power cord receptacle, an edge of the optical carriage assembly 118, slot 116 in optical carriage assembly 118, hole 108 in the scanner housing 100, by some spring force, or by some other known means.

The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An optical carriage locking system for a scanner that prevents power to the scanner from being turned on when the scanner's optical carriage assembly is in the locked position, said optical carriage locking system comprising:

a power cord lock-out member for preventing a power cord receptacle of said scanner from receiving a power cord when said power cord lock-out member is in a locked position, said power cord lock-out member permitting said power cord receptacle of said scanner to receive a power cord when said power cord lock-out member is in an unlocked position; and a carriage latch for preventing said optical carriage assembly of said scanner from moving within said scanner when said carriage latch is in a latched position, said carriage latch permitting said optical carriage assembly of said scanner to move within said scanner as intended during scanner operations when said carriage latch is in an unlatched position, said power cord lock-out member and said carriage latch being attached in such a manner that when said carriage latch is in the latched position, said power cord lock-out member is in the locked position and when said carriage latch is in the unlatched position, said power cord lock-out member is in the unlocked position.

2. The optical carriage locking system according to claim 1 further comprising a locking member for maintaining said power cord lock-out member in a locked position and said carriage latch in a latched position until said locking member is unlocked.

3. The optical carriage locking system according to claim 1 further comprising a locking member that is spring-loaded in such a manner that whenever a power cord is not inserted in said power cord receptacle, said carriage latch is in the latched position and said optical carriage assembly is prevented from moving within said scanner.

* * * * *